United States Patent
Takenaka

(10) Patent No.: US 10,164,436 B2
(45) Date of Patent: Dec. 25, 2018

(54) POWER CONTROL SYSTEM, POWER CONTROL APPARATUS AND POWER CONTROL METHOD

(71) Applicant: KYOCERA CORPORATION, Kyoto (JP)

(72) Inventor: Tetsuya Takenaka, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 961 days.

(21) Appl. No.: 14/382,533

(22) PCT Filed: Mar. 1, 2013

(86) PCT No.: PCT/JP2013/001283
§ 371 (c)(1),
(2) Date: Sep. 2, 2014

(87) PCT Pub. No.: WO2013/128947
PCT Pub. Date: Sep. 6, 2013

(65) Prior Publication Data
US 2015/0097429 A1    Apr. 9, 2015

(30) Foreign Application Priority Data
Mar. 2, 2012  (JP) .................... 2012-047088

(51) Int. Cl.
*H02J 3/02* (2006.01)
*H02J 3/32* (2006.01)
(Continued)

(52) U.S. Cl.
CPC ............. *H02J 3/32* (2013.01); *H01M 10/441* (2013.01); *H01M 10/465* (2013.01);
(Continued)

(58) Field of Classification Search
CPC .......... G06F 19/00; G06F 19/10; H02M 5/45; H02M 7/5387; H02J 3/32; H02J 3/00;
(Continued)

(56) References Cited

U.S. PATENT DOCUMENTS

| 8,350,411 B2 * | 1/2013 | Kimball | H02J 7/34 307/64 |
| 8,987,939 B2 * | 3/2015 | Yu | H02J 3/28 307/43 |

(Continued)

FOREIGN PATENT DOCUMENTS

| JP | 2005-130572 A | 5/2005 |
| JP | 2008-048544 A | 2/2008 |

(Continued)

OTHER PUBLICATIONS

Office Action dated Jun. 23, 2015, issued in counterpart Japanese application No. 2012-047088 and concise explanation.

(Continued)

*Primary Examiner* — Fritz M Fleming
*Assistant Examiner* — Jagdeep Dhillon
(74) *Attorney, Agent, or Firm* — Procopio Cory Hargreaves and Savitch LLP

(57) ABSTRACT

In a power control system including a first controller configured to control supply of power from a photovoltaic module to a plurality of loads and a second controller configured to control charge/discharge of a storage battery, which is one of the plurality of loads, the first controller controls output following power consumption by the plurality of loads, and the second controller increases, during a self-sustaining operation, charging power of the storage battery and detects output fluctuation from the photovoltaic module or from the first controller along with the increase in the charging power, then based on the detected output (Continued)

fluctuation, controls charge of the storage battery, thus, even if connection to the grid is disconnected, supply power may be replenished by the load power used for supply to the predetermined loads, thereby allowing a stable power supply to the other loads.

16 Claims, 4 Drawing Sheets

(51) Int. Cl.
*H02J 7/35* (2006.01)
*H02J 3/38* (2006.01)
*H01M 10/44* (2006.01)
*H01M 10/46* (2006.01)

(52) U.S. Cl.
CPC ............... *H02J 3/383* (2013.01); *H02J 7/35* (2013.01); *Y02B 10/14* (2013.01); *Y02E 10/563* (2013.01); *Y02E 10/566* (2013.01); *Y02E 70/30* (2013.01); *Y02P 80/23* (2015.11); *Y02P 90/50* (2015.11); *Y10T 307/313* (2015.04); *Y10T 307/336* (2015.04)

(58) Field of Classification Search
CPC ........ H02J 7/35; H02J 7/00; H02J 9/00; H02J 9/06; H02J 9/062; H02J 1/10; B60H 1/32; B60P 3/20; F25B 27/00
USPC ............ 307/22, 65, 64, 66, 77, 84; 700/292, 700/287, 291, 297; 363/37, 132; 324/427, 421; 62/235.1, 236, 243
See application file for complete search history.

(56) References Cited

U.S. PATENT DOCUMENTS

| | | | |
|---|---|---|---|
| 2008/0278000 A1* | 11/2008 | Capp | H02J 3/04 307/21 |
| 2009/0302681 A1 | 12/2009 | Yamada et al. | |
| 2010/0008119 A1* | 1/2010 | O'Brien | H01L 31/02021 363/132 |
| 2011/0060474 A1* | 3/2011 | Schmiegel | H02J 3/383 700/291 |
| 2011/0222320 A1* | 9/2011 | Delmerico | H02J 3/32 363/37 |
| 2011/0291483 A1 | 12/2011 | Yamane et al. | |
| 2012/0271470 A1* | 10/2012 | Flynn | H02J 3/383 700/292 |
| 2013/0000342 A1* | 1/2013 | Blasko | B60H 1/00428 62/235.1 |
| 2013/0002027 A1* | 1/2013 | Yu | H02J 9/061 307/66 |
| 2013/0026840 A1* | 1/2013 | Arditi | H02J 1/10 307/77 |
| 2013/0041516 A1* | 2/2013 | Rockenfeller | H02J 3/38 700/287 |
| 2013/0173190 A1* | 7/2013 | Yu | G01R 31/3651 702/61 |
| 2013/0270911 A1* | 10/2013 | Baba | H02J 7/34 307/65 |
| 2014/0062202 A1 | 3/2014 | Yamada et al. | |

FOREIGN PATENT DOCUMENTS

JP 2012-196023 A 10/2012
WO 2011/151939 A1 12/2011

OTHER PUBLICATIONS

International Search Report; PCT/JP2013/001283; dated Apr. 16, 2013.
Written Opinion of the International Searching Authority; PCT/JP2013/001283; dated Apr. 16, 2013; with concise explanation.

* cited by examiner

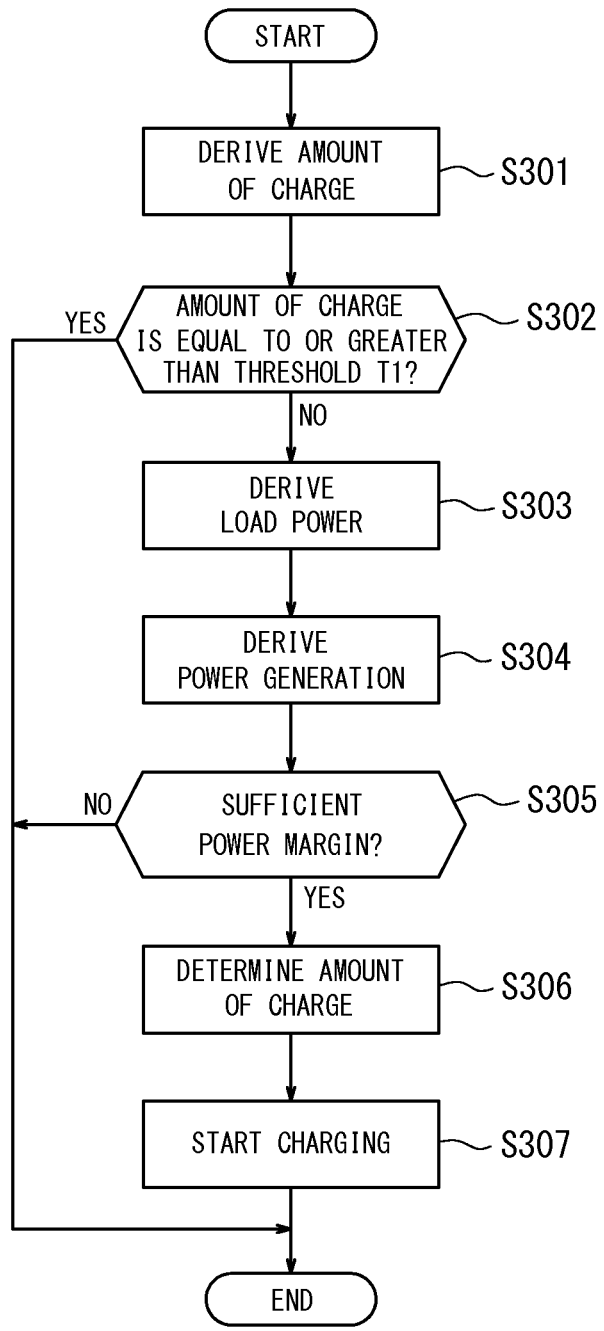

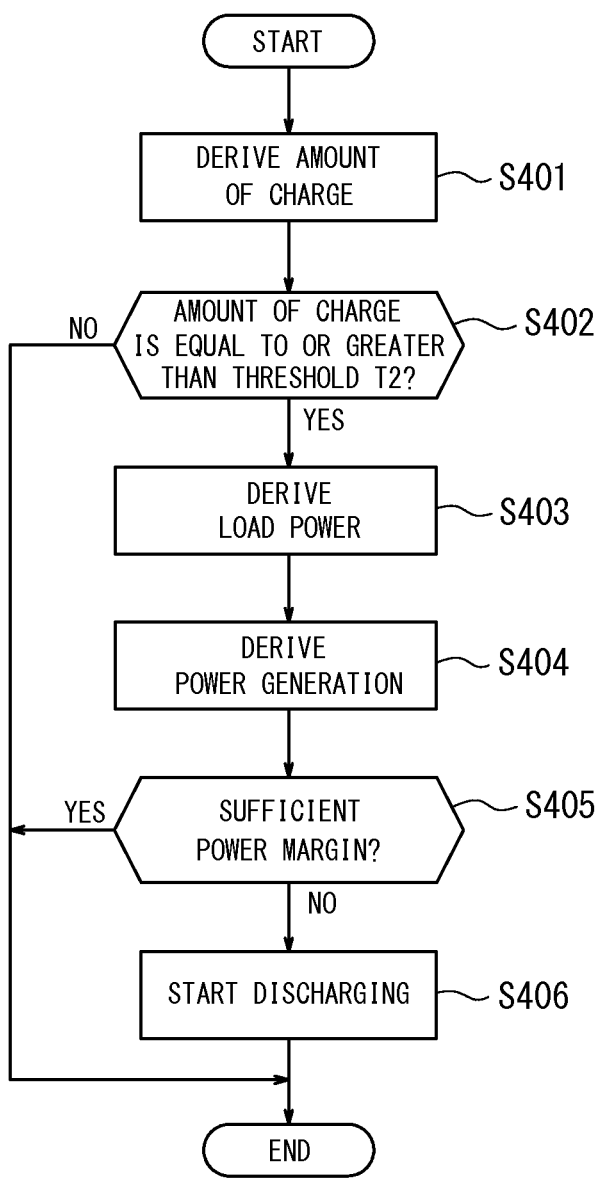

POWER CONTROL SYSTEM, POWER CONTROL APPARATUS AND POWER CONTROL METHOD

CROSS REFERENCE TO RELATED APPLICATION

The present application claims the priority of Japanese Patent Application No. 2012-047088 filed on Mar. 2, 2012, the content of which is entirely incorporated herein by reference.

FIELD

The present invention relates to a control system configured to control power supply from photovoltaic modules to loads, a control apparatus and a control method.

BACKGROUND

In the context of environmental issues and safety requirements, power generation by sunlight or wind power has attracted attention. For example, there is a growing number of households that introduce a photovoltaic power generation system. In the photovoltaic power generation system, the power generated by a photovoltaic module is supplied to the domestic electric power load (hereinafter referred merely to as load). Then, when the power generation exceeds the power consumption by the load, the excess power generation is fed back and sold to the commercial power grid (hereinafter referred merely to as grid). Then, when the power consumption by the load increases and exceeds the power generation, the shortfall is compensated by the power supplied from the grid.

Furthermore, recently, in order to secure power supply to loads when unforeseen blackout or operation stop occurs on the grid side due to disasters and the like, or to utilize the night power effectively, a distributed power generation system in which excessively generated power is previously stored in a storage battery has attracted attention. Patent Literature 1 discloses a distributed power generation system configured by adding a storage battery to an existing power generation system.

CITATION LIST

Patent Literature

PTL 1: JP2005130572A

SUMMARY OF INVENTION

In the distributed power generation system configured by adding a storage battery to an existing photovoltaic power generation system, a storage battery is an additional load to a power supply apparatus for controlling (including conditioning) photovoltaic power generation (hereinafter referred to as PV (Photovoltaic) power conditioner). Thus, for that, the power to be supplied to the entire loads increases. Hereinafter the power consumed by loads such as electrical appliance is referred to as power consumption, the power for charging a storage battery is referred to as charging power, and the power to be supplied to the entire loads including a storage battery, that is, the power including power consumption and charging power, is referred to as load power.

In the distributed power generation system, when connection with the grid is disconnected during the blackout and power cannot be fed back, the PV power conditioner side performs what is called a self-sustaining operation. In the self-sustaining operation, in order to minimize the unnecessary increase in voltage due to excess power generation, control is made so that the power following the load power is output from the power generated by the photovoltaic module. In these circumstances, for example, when many electrical appliances are operated at the same time and the power consumption by the load increases rapidly, output power from the photovoltaic module increases rapidly following thereto. Then, when it is expected that the output power exceeds the power generation, the PV power conditioner performs a safety-centered control by which the output power is stopped, thus load power cannot be supplied any more. In particular, in the distributed power generation system configured by mounting a storage battery as an additional load, power of the power generation that may be spared for output is decreased for the power added to charge the storage battery. Thus such situation may readily occur.

In view of the aforementioned problems, the present invention is to provide a control system that enables stable power supply from a photovoltaic module to a load even if connection with a grid is disconnected.

According to one aspect of the present invention to solve the aforementioned problem, in a power control system including a first controller configured to control power supply from a photovoltaic module to a plurality of loads and a second controller configured to control charge/discharge of a storage battery, which is one of the plurality of loads, the first controller controls the output following the power consumption by the plurality of loads, and the second controller increases charging power to the storage battery during a self-sustaining operation, detects output fluctuation from the photovoltaic module or the first controller along with the increase in the charging power, and controls the charge to the storage battery based on the detected output fluctuation.

According to one embodiment of the aforementioned aspect, the second controller computes, based on the output fluctuation, the power generation, which is a power that may be supplied by the photovoltaic module or the first controller and, when the power consumed by a plurality of loads other than the storage battery is greater than the power generation, controls charge/discharge of the storage battery so that the power of the storage battery is discharged to the loads other than the storage battery.

According to another embodiment of the aforementioned aspect, the second controller performs processing of detecting the output fluctuation at regular intervals.

According to still another embodiment of the aforementioned aspect, when performing processing of detecting the output fluctuation, the second controller gradually increases the charging power to the storage battery and monitors change in the charging power, thereby computing a maximum power that may be output by the photovoltaic module or the first controller.

According to yet another embodiment of the aforementioned aspect, the second controller controls, on the condition that the amount of charge in the storage battery falls below a reference value, so that the power is charged to the storage battery.

According to a further embodiment of the aforementioned aspect, the second controller controls, on the condition that the amount of charge in the storage battery exceeds a reference value, so that the power is discharged from the storage battery.

According to a still further embodiment of the aforementioned aspect, when the power generation reaches within a predetermined range, power supply by the first controller is stopped.

According to a yet further embodiment of the aforementioned aspect, the plurality of loads are connected in parallel to the first controller, and the second controller conditions, when a power is charged to the storage battery, the power supplied to the storage battery so that a voltage of the storage battery will be lower than a voltage of power supplied to the loads other than the storage battery.

According to a still yet further embodiment of the aforementioned aspect, the first controller and the plurality of loads are connected to a commercial power grid so that a part of the power generation is output to the commercial power grid when the power generation exceeds the load power consumed by the plurality of loads, or a part of the load power is supplied from the commercial power grid when the power generation falls below the load power, and the second controller controls charge/discharge so that power supply to the storage battery will be or will not be performed when connection with the commercial power grid is disconnected.

According to another aspect of the present invention, in a power control apparatus including a controller configured to control charge/discharge of a storage battery connected to a photovoltaic module system that performs a load-following control, during a self-sustaining operation, the controller increases a charging power to the storage battery and detects output fluctuation of the photovoltaic module along with an increase in the charging power, thereby controlling the charge to the storage battery based on the detected output fluctuation.

As aforementioned, the means for solving the problems according to the present invention is described as an apparatus. However, it should be understood that the present invention may be realized as method, program or storage medium storing program corresponding substantially thereto, and they are included in the scope of the present invention. Note that in each step of a method or a program, processing unit such as CPU, DPS and the like are used, as necessary, for data processing, and the input data and processed/generated data are stored in a storage device such as HDD, memory and the like.

For example, a power control method that realizes the present invention as a method includes the steps of controlling charge/discharge of a storage battery connected to a photovoltaic module system that performs a load following control; during a self-sustaining operation, increasing a charging power to the storage battery and detecting output fluctuation of a photovoltaic module system with an increase in the charging power, and controlling the charge to the storage battery based on the detected output fluctuation.

Effect of the Invention

According to one of the aforementioned aspects, the second controller increases, during a self-sustaining operation, a charging power to the storage battery, detects output fluctuation from the photovoltaic module or from the first controller with an increase in the charging power, and, based on the detected output fluctuation, controls the charge to the storage battery, thereby allowing stable power supply from a photovoltaic module to a load even if connection with a grid is disconnected.

BRIEF DESCRIPTION OF DRAWINGS

FIG. 3 is a flowchart diagram illustrating operating procedure for charge control of a load 102 by a power-storage power conditioner 106; and FIG. 4 is a flowchart diagram illustrating operating procedure for discharge control of the load 102 by the power-storage power conditioner 106.

DESCRIPTION OF EMBODIMENTS

In the following, embodiments according to the present invention will be described with reference to the drawings. However, the technical scope of the present invention is not limited to these embodiments, and includes the matters and their equivalents described in the scope of claims.

Figure 1:
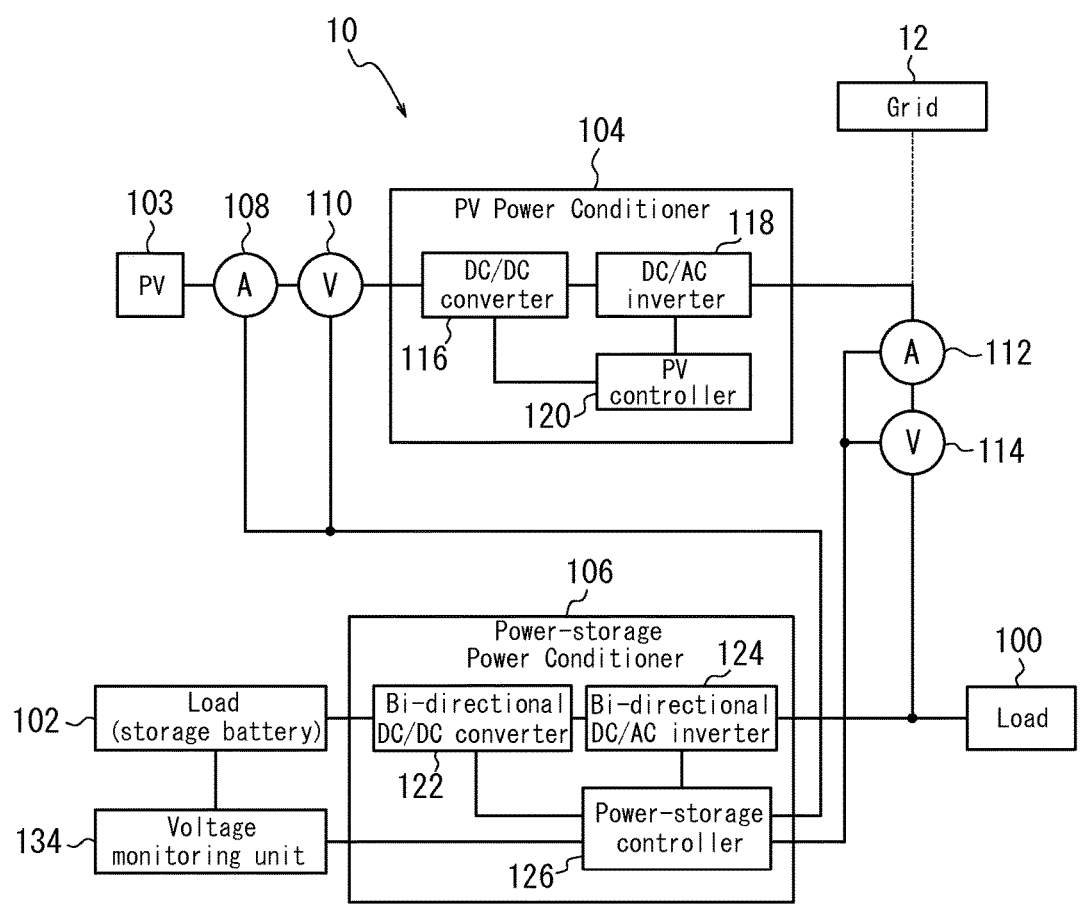
FIG. 1 is a diagram illustrating a configuration example of a distributed power generation system to which a control apparatus according to the present embodiment is applied.

FIG. 1 is a diagram illustrating a configuration example of a distributed power generation system to which a control apparatus according to the present embodiment is applied. The distributed power generation system 10 is provided, for example, in household or various commercial and industrial facilities, and the power generated by a photovoltaic module 103 is supplied to loads 100 and 102 in household or facilities. For the photovoltaic module 103, for example, power generation units each having a photoelectric conversion cell are connected in a matrix manner and a predetermined short-circuit current (e.g. 10A) is output. As the photovoltaic module 103, any type such as silicon polycrystal photovoltaic modules, silicon monocrystal photovoltaic modules, or film photovoltaic modules such as CIGS and the like may be used as long as it performs photoelectric conversion.

Loads 100 and 102 are connected in parallel to a PV power conditioner 104 that controls the power taken from the photovoltaic module 103. The load 100 is a power load that consumes power, such as, for example, various electrical appliances like air conditioners, microwaves, TV sets and the like used in households and machines, and light fixtures and the like such as air-conditioning equipment, lighting apparatus and the like used in commercial and industrial facilities. The load 100 is an example of a first load according to the present embodiment. A power to be supplied to the load 100 fluctuates. In addition, for the load 102, a power to be input thereto/output therefrom may be conditioned and a power to be input is absorbed thereby. For example, the load 102 is a storage battery capable of charging/discharging. The storage battery is, for example, a lithium battery in which a plurality of cells are connected in series, a lead battery and the like. In the following, an example where the load 102 is a storage battery is given. The load 102 is not limited to a storage battery as long as it is an electrical load that absorbs an input power that may be conditioned, and may be, for example, a water heater and the like. The load 102 is an example of a second load according to the present embodiment, that a power to be supplied thereto may be conditioned. Then, the power consumed by the load 100 and the power charged to the load 102 are included in the load power to be supplied to the entire loads 100 and 102.

This distributed power generation system 10 is connected to the grid 12. The distributed power generation system 10 causes, in coordination with the grid 12, when the power generation by the photovoltaic module 103 exceeds the load power to be supplied to the loads 100 and 102, the excess power generation to be fed back to the grid 12. In addition, when the power generation by the photovoltaic module 103 falls below the load power, the shortage is supplied from the grid 12. However, if the grid 12 loses power due to, for example, disasters and the like, connection with the grid 12 is disconnected, and the power may neither be fed back to nor supplied from the grid any more. The embodiment described below relates to the case where the connection with the grid 12 is disconnected.

In the distributed power generation system 10, the PV power conditioner 104 controls the power taken from the power generated by the photovoltaic module 103. In the PV power conditioner 104, a DC/DC converter 116 increases the DC voltage of the photovoltaic module 103. For example, when the output voltage from the photovoltaic module 103 is within a range from 60 to 80V, the DC voltage of the photovoltaic module 103 is increased to a range from 300 to 400V. Then, the DC/AC inverter 118 converts the DC voltage into AC. For example, the DC voltage is converted, for the general household, into 100V/200V of the single-phase three-wire system since wave output. In this manner, the power generation by the photovoltaic module 103 is supplied to the loads 100 and 102 trough the DC/DC converter 116 and the DC/AC inverter 118. At this time, under the control of the PV controller 120, either one or both of DC/DC converter 116 and DC/AC inverter 118 control(s) the passing current, thereby the power corresponding to the load power of the power generation by the photovoltaic module 103 is output. That is, the power following the load power is output from the power generation by the photovoltaic module 103. Note that, when the power is supplied from the grid 12 and the connection is not disconnected, MPPT (Maximum Power Point Tracking) control is performed so that the output power from the photovoltaic module 103 will be the maximum.

The PV controller 120 outputs a control signal to the DC/DC converter 116 and the DC/AC inverter 118 for controlling their operations. The PV controller 120 is, for example, a microcomputer, and has a CPU (Central Processing Unit) configured to execute control procedure according to a storage medium that stores control programs and a control program.

The distributed power generation system 10 further has a power-storage power supply apparatus (power conditioner) 106 configured to control charge/discharge of the load 102, which is a storage battery. In the power-storage power conditioner 106, the bi-directional DC/AC inverter 124 converts AC supplied from the photovoltaic module 103 into DC and outputs it to the bi-directional DC/DC converter 122, and converts DC into AC and outputs it to the load 100. In addition, the bi-directional DC/DC converter 122 reduces DC voltage from the bi-directional DC/AC inverter 124 and outputs it to the load 102, and increases DC voltage of the load 102 and outputs it to the bi-directional DC/AC inverter 124. At this time, under the control of a power-storage controller 126, either one or both of the bi-directional DC/DC converter 122 and the bi-directional DC/AC inverter 124 control(s) the passing current, thereby controlling the power supply to the load 102, which is a storage battery. That is, charge/discharge is controlled. The present embodiment shows an example where both of or either one of the bi-directional DC/DC converter 122 and the bi-directional DC/AC inverter 124 are/is "conditioning unit."

The power-storage controller 126 outputs a control signal to the bi-directional DC/DC converter 122 and the bi-directional DC/AC inverter 124 to control their operations. The power-storage controller 126 is, for example, a microcomputer, and has a storage medium that stores control programs and a CPU that executes control procedure according to a control program. The power-storage controller 126 is an example of "controller" in the present embodiment.

The power-storage power conditioner 106 including these bi-directional DC/DC converter 122, bi-directional DC/AC inverter 124 and power-storage controller 126 corresponds to the "control apparatus" in the present embodiment.

The distributed power generation system 10 includes a DC current sensor 108 configured to detect DC current that is input from the photovoltaic module 103 to the PV power conditioner 104. Furthermore, the distributed power generation system 10 includes a DC voltage sensor 110 configured to detect DC voltage that is input from the photovoltaic module 103 to the PV power conditioner 104. The data detected by the DC current sensor 108 and the DC voltage sensor 110 is transmitted to the power-storage controller 126 of the power-storage power conditioner 106. Furthermore, the distributed power generation system 10 may include, instead of or in addition to the DC current sensor 108 and the DC voltage sensor 110, an AC current sensor 112 configured to detect AC current that is output from the PV power conditioner 104 to the loads 100 and 102 and an AC voltage sensor 114 configured to detect AC voltage that is output from the PV power conditioner 104 to the loads 100 and 102. The data detected by the AC current sensor 112 and the AC voltage sensor 114 is transmitted to the power-storage controller 126 of the power-storage power conditioner 106. Then, the power-storage controller 126 obtains the output current from the photovoltaic module 103 based on the detection data transmitted from either one or both of the DC current sensor 108 and the AC current sensor 112. In addition, the power-storage controller 126 obtains the output voltage from the photovoltaic module 103 based on the detection data transmitted from either one or both of the DC voltage sensor 110 and the AC voltage sensor 114.

Furthermore, the distributed power generation system 10 includes a voltage monitoring unit 134 configured to detect a voltage of the load 102 at regular intervals (e.g. every tens of milliseconds). The voltage monitoring unit 134 may be provided outside or inside the power-storage power conditioner 106. The detection data by the voltage monitoring unit 134 is transmitted to the power-storage controller 126. Then, the power-storage controller 126 obtains a voltage of the load 102 from the detection data.

Figure 2:
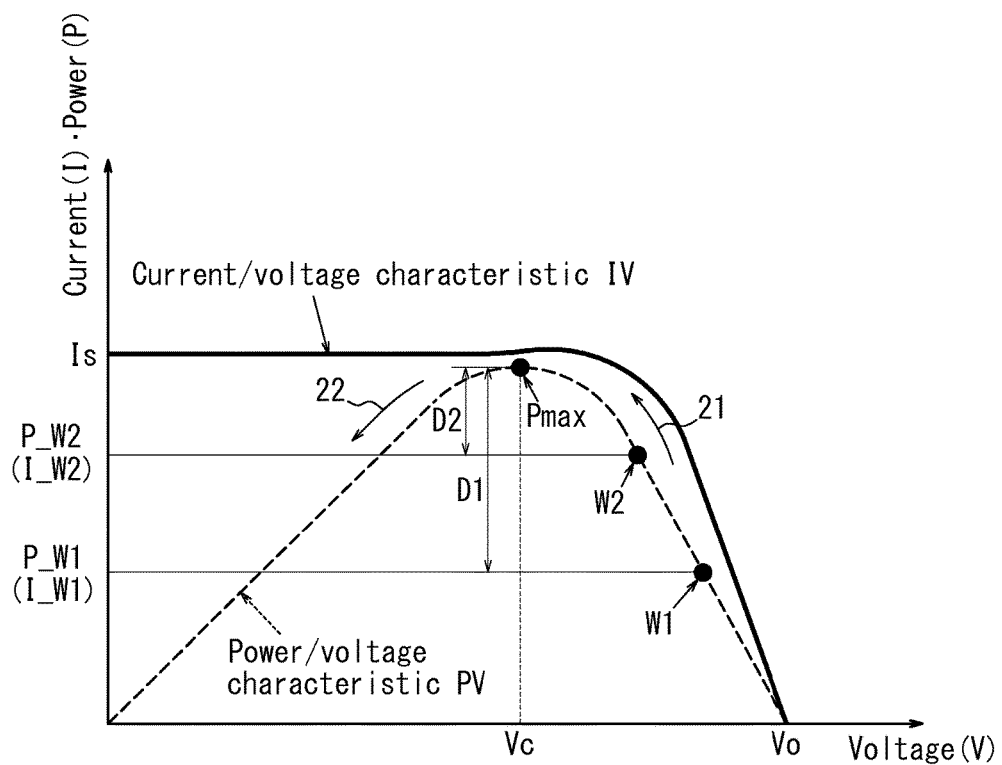
FIG. 2 is a diagram illustrating power generation by a photovoltaic module 103.

FIG. 2 is a diagram illustrating power generation by the photovoltaic module 103. FIG. 2 illustrates a current/voltage characteristic (solid line) IV and a power/voltage characteristic (dotted line) PV of the power generation by the photovoltaic module 103, with a certain amount of solar radiation. The horizontal axis and the vertical axis represent respectively voltage and current.

The current/voltage characteristic IV and the current/voltage characteristic PV have the following relation: In the current/voltage characteristic IV, the intercept of the voltage axis and the intercept of the current axis correspond respectively to the open voltage Vo and the short-circuit voltage Is of the photovoltaic module 103. As indicated by the current/voltage characteristic IV, the power generation by the photovoltaic module 103 has a characteristic in that the current increases as the voltage declines from the open voltage Vo to the voltage Vc, and when the voltage falls below the voltage Vc, the current approximately coincides with the short-circuit current Is, whereas the power/voltage characteristic PV appears in an approximate quadratic curve with a maximum Pmax at a voltage Vc. This power Pmax is power generation that may be supplied by the photovoltaic module 103. Note that, such current/voltage characteristic IV and the power/voltage characteristic PV corresponding thereto are varied by the sunlight. That is, when the sunlight is strong, the current/voltage characteristic IV and the power/voltage characteristic PV shift upward in the drawing, and when the sunlight is weak, they shift downward.

Here, the operating point of the output power from the photovoltaic module 103 will be explained. As described above, the output power from the photovoltaic module 103 is controlled by the PV power conditioner 104 so that it will follow the load power. For example, suppose that the sum of the power consumption by a microwave, which is the load 100, and the charging power to the load 102, which is a storage battery, that is, a load power, is P_W1. At this time, the PV power conditioner 104 controls so that the output current from the photovoltaic module 103 will be the current I_W1 corresponding to the load power P_W1. The operating point W1 at this time is indicated on the power/voltage characteristic PV. At this time, the load power P_W1 is smaller than the power generation Pmax, thus the photovoltaic module 103 has enough power margin for outputting a power corresponding to the difference D1 between the power generation Pmax and the load power P_W1.

Next, the case where the load power is increased is explained. For example, suppose that, in addition to the microwave, which is the load 100, an air conditioner is operated and the power consumption increases. Then, the sum of the power consumption by the load 100 and the charging power to the load 102, which is a storage battery, is increased to P_W2. Then, the output current from the photovoltaic module 103 is controlled by the PV power conditioner 104 so that it will be the current I_W2 corresponding to the load power P_W2, and the operating point W1 on the power/voltage characteristic PV shifts to W2. At this time, as illustrated in the diagram, if the load power P_W2 is still smaller than the power generation Pmax, the photovoltaic module 103 has enough power margin for outputting a power corresponding to the difference D2 between the power generation Pmax and the load power P_W2. Thus, the load power to loads 100 and 102 is stably supplied. However, if the load power P_W2 to be supplied exceeds the power generation Pmax, shortage in power supply occurs. Therefore, the PV power conditioner 104 stops operating at the point of time when the load power P_W2 to be supplied exceeds the power generation Pmax, or at the point of time when such situation is expected. Such point of time is, for example, the point of time when the load power P_W2 reaches within a predetermined range (any range of power determined by experiments and the like) from the power generation Pmax, that is, for example, the range regarded as approximately coincided with the power generation Pmax. Alternatively, such point of time may be when the width of increase in the output power or the output current declines below a certain value (any value determined by experiments and the like at which the width of increase is regarded substantially as zero). Then, when the PV power conditioner 104 stops operating, it interferes with supply of load power.

Thus, in the present embodiment, the power-storage power conditioner 106 computes the load power and the power generation from the output power from the photovoltaic module 103, and controls charge/discharge of the load 102 according to the power margin for output. Specifically, when it is not likely that the increase in the load power exceeds the power margin for output, the load 102 is charged, and when it is likely that it exceeds the power margin, charge to the load 102 is stopped, and thus the power spared for charge is used to supply to the load 100. If it is still likely that the power supply to the load 100 is not enough, the load 102 is discharged, thereby increasing the supply amount of load power. Thus, using the charged power, the inconvenient operation by which, despite supply of load power, the output from the photovoltaic module 103 is stopped by the PV power conditioner may be avoided, thereby allowing a stable supply of load power.

Here, how to compute the load power and the power generation will be explained. First, with charge by the bi-directional DC/DC converter 122 to the load 102 stopped, the power-storage controller 126 derives the load power from the output current obtained from the DC current sensor 108 or the AC current sensor 112, or the output voltage obtained from the DC voltage sensor 110 or the AC voltage sensor 114. Here, the derived load power corresponds to the load power required for the photovoltaic module 103.

Next, the power-storage controller 126 obtains the output power and the bi-directional DC/DC converter 122 gradually increases the charging power to the load 102 as well. Until the power output from the photovoltaic module 103 reaches the power generation Pmax, as the charging power increases, the operating point of the output power increases toward the power generation Pmax (arrow 21). At this time, the increment of the output power per unit increment of the charging power gradually decreases as the operating point approaches the power generation Pmax. Then, when the charging power is further increased and the load power exceeds the power generation Pmax, the output power from the photovoltaic module 103 starts decreasing (22). Therefore, for example, at the point of time when the increment of the output power falls below the predetermined reference value, the bi-directional DC/DC converter 122 stops charging to the load 102, and the power-storage controller 126 derives the power generation Pmax from the output power before charge is stopped.

The reference value used for such determination is previously computed, for example, from experiments and the like, and is stored in a nonvolatile memory and the like in the power-storage controller 126. Note that, when the reference value is "0," at the point of time when the output power decreases, that is, at the point of time when the operating point passes the power generation Pmax, the power generation Pmax may be derived. However, for a stable supply of load power, it is preferable that the reference value be set to a value greater than "0." Note that, as a computation method of power generation, a method of monitoring the increment of the output power from the photovoltaic module 103 is described. However, by monitoring the increment of the output current from the photovoltaic module 103, the power generation may be computed from the output current and the voltage when the increment gradually decreases and falls below the reference value.

Note that the power generation by the photovoltaic module 103 varies according to the sunlight, thus the aforementioned procedure is executed at regular intervals (e.g. from every tens of milliseconds to tens of sec).

Next, procedure for controlling the power supply to the load 102 according to the power margin of power generation, based on the power generation and the load power computed as aforementioned, will be explained with reference to FIGS. 3 and 4.

FIG. 3 is a flowchart diagram illustrating operating procedure for controlling charge to the load 102 by the power-storage power conditioner 106. The procedures illustrated in FIG. 3 correspond to the operating procedures of the power-storage controller 126 of the power-storage power conditioner 106 and are executed at regular intervals (e.g. from tens of milliseconds to a few seconds).

First, the power-storage controller 126 obtains an amount of charge of the storage battery, that is, the load 102 (step 301). For example, the power-storage controller 126 derives the amount of charge (remaining amount) based on the voltage of the load 102 obtained from the voltage monitoring unit 134. When the amount of charge is equal to or greater than the predetermined threshold T1 (Yes in step 302), the power-storage controller 126 does not perform charge and ends the process. Here, as the threshold T1, any values/units indicating a sufficient amount of charge are used. Such threshold T1 is computed previously by experiments and the like. On the other hand, when the amount of charge is less than the predetermined threshold T1 (No in step 302), the power-storage controller 126 derives the load power (step 303) to derive the power generation (step 304). The power-storage controller 126 derives the power generation by, for example, the method illustrated in FIG. 2.

Then, whether or not the power generation has enough power margin is determined (step 305). For example, the power-storage controller 126 derives the load power by the method illustrated in FIG. 2, and determines whether or not the load power exceeds the reference power corresponding to the power generation.

As the reference power, for example, the power resulting from subtracting a certain power margin from the power generation, or the power resulting from multiplying the power generation by a predetermined rate so that a certain amount of power margin will be left is used. It is preferable that the certain amount of power margin be, for example, a value greater than the maximum power consumption of the power consumption by the load 100 in the household in which the distributed power generation system 10 is installed.

For example, when the load that consumes the largest power is an air conditioner with power consumption of 600 W in the household in which the distributed power generation system 10 is installed, if the air conditioner is operated during use of a microwave whose power consumption is 500 W, the load power increases due to the power consumed by the air conditioner, and will be 1100 W. In this case, if there is enough power margin to absorb such an increase in the load power, the load power will not exceed the power generation. For example, suppose that when the power generation under a certain sunlight condition is 1500 W, the reference power is 1500 W−600 W=900 W. At this time, if the load power 500 W during use of the microwave is equal to or less than the reference power 900 W, which is value set by anticipating an additional 600 W due to an air conditioner, even if the air conditioner is added, a load power may be supplied within the power generation. Therefore, in that case, even if charge to the load 102 increases the load power by a certain amount, it is determined that the likelihood that the load power exceeds immediately the power generation due to additional increase in the load power is low. That is, it is determined that the power generation has enough power margin. On the contrary, if the load power exceeds the reference power, it is determined that the likelihood that the load power exceeds the power generation due to the additional increase in the load power is high. That is, it is determined that the power generation has no power margin.

As a result of the aforementioned determination based on the reference power, if the power generation has no power margin (No in step 305), the power-storage controller 126 does not perform charge and ends the process, thereby sparing no load power for charge and allowing a stable power supply to the load 100. Note that, even if the load 102 is a power load other than a storage battery, a stable power supply to the load 100 may be secured by stopping power supply to the load 102. On the other hand, if the power generation has power margin (Yes in step 305), the power-storage controller 126 determines the charging power according to the power margin of the power generation (step 306). For example, in the aforementioned example, the difference between the reference power and the load power, that is, 900 W−500 W=400 W, may be used for the charging power. Thus, the charging power of 400 W or less than that with some margins is determined. Then, the power-storage controller 126 starts charging to the load 102 (step 307), thus charge to be prepared for discharge from the load 102 may be performed as illustrated next in FIG. 4.

Note that, in the procedure step 307, it is preferable that the power-storage controller 126 cause the bi-directional DC/DC converter 122 to control the charging power so that the voltage of the load 102 will be lower than the output voltage from the photovoltaic module 103. Thus, current runs from the load 102 to the load 100 before discharge is started in the procedure mentioned later, thereby preventing the power from being supplied uselessly.

In addition, in the procedure step 302 in FIG. 3, whether charge is performed or not is determined previously according to the amount of charge of the load 102, thereby avoiding the situation where, despite a determination made to charge because power generation has no power margin in the following procedure, the amount of charge is enough and there is no need for charge (or charge cannot be performed). Therefore, CPU load and processing time for useless process may be omitted. Note that, the procedure where the determination procedure in step 302 is omitted and whether charge is performed or not is determined based merely on whether the power generation has a power margin or not is also included in the present embodiment. Even in that case, when the power generation has no power margin, a stable power supply to the load 100 is realized without spending the load power for charging power.

FIG. 4 is a flowchart illustrating operating procedure for controlling discharge of the load 102 by the power-storage power conditioner 106. The procedure in FIG. 4 corresponds to the operating procedures of the power-storage controller 126 of the power-storage power conditioner 106, and is executed at predetermined intervals (e.g. from tens of milliseconds to a few seconds).

First, the power-storage controller 126 derives the amount of charge of the storage battery, that is, the load 102 (step 401). For example, the power-storage controller 126 computes the amount of charge (remaining amount) in the same manner as step 301 in FIG. 3. When the amount of charge is less than the predetermined threshold T2 (No in step 402), the power-storage controller 126 does not perform discharge and ends the process. Here, as the threshold T2, any values/units indicating enough amount of charge that may be discharged may be used. Such threshold T2 may be computed previously by experiments and the like. On the other hand, when the amount of charge is equal to or more than the predetermined threshold T2 (Yes in step 402), the power-storage controller 126 derives the load power (step 403) to derive the power generation (step 404). The power-storage controller 126 derives the power generation based on, for example, the method illustrated in FIG. 2.

Then, whether the power generation has enough power margin or not is determined (step 405). Here, for example, the same procedure as illustrated in the procedure step 305 in FIG. 3 is performed. When the power generation has enough power margin (Yes in step 405), the power-storage controller 126 does not perform discharge, and ends the process. At this time, the load power is supplied stably in the power generation, thus it is not necessary to discharge the load 102 to replenish the load power. Then, in this case, if the amount of charge is not enough when the procedure in FIG. 3 is executed, charge is performed. On the other hand, when the power generation has no power margin (No in step 405), the power-storage controller 126 starts discharging the load 102 (step 406). Thus, even if the power supply to the load power is not enough only by stopping the charge, a stable power supply to the load 100 may be realized.

Note that, in the determination process of procedure step 405, it is preferable that, instead of DC current and voltage obtained through the DC current sensor 108 and the DC voltage sensor 110 and input to the PV power conditioner 104, AC current and voltage obtained through the AC current sensor 112 and the AC voltage sensor 114 and output from the PV power conditioner 104 be used to compute the load power, since this procedure does not pass through the pressure increase and conversion process by the PV power conditioner 104, thereby, for that, allowing more immediate response when discharge is needed.

In addition, in the procedure step 402 in FIG. 4, whether discharge is performed or not is previously determined according to the amount of charge of the load 102, thereby avoiding the situation where, despite a determination made to discharge because power generation has no power margin in the following procedure, the amount of charge is not enough and discharge cannot be performed. Therefore, CPU load and processing time required for useless process may be avoided. Note that, the procedure where the determination procedure in step 402 is avoided and whether discharge is performed or not is determined based merely on whether the power generation has a power margin or not is also included in the present embodiment. Even in that case, if a certain amount of power has been charged to the load 102, when the power generation has no power margin, the power may be replenished by discharge, thereby allowing a stable power supply to the load 100.

The procedures illustrated respectively in FIGS. 3 and 4 are executed at regular intervals, thus, even if the power generation varies depending on the sunlight, a power margin may be computed immediately depending on the power generation, thereby allowing a flexible response.

As aforementioned, according to the present embodiment, even in the case where a distributed power generation system is configured by adding a storage battery to an existing photovoltaic power generation system, charge/discharge of the storage battery may be controlled based on the output current from the photovoltaic module, thus the load power supply may be controlled without need for the power-storage power conditioner to obtain the control data from the PV power conditioner.

As explained above, according to the present embodiment, even if connection with the grid is disconnected, a stable power supply from the photovoltaic module to the load may be realized.

REFERENCE SIGNS LIST

10 Distributed power generation system
103 Photovoltaic module
106 Power-storage power conditioner
102 Load (storage battery)
122 Bi-directional DC/DC converter
126 Power-storage controller

The invention claimed is:

1. A power control system, comprising:
a first controller configured to control supply of power from a photovoltaic module to a plurality of loads; and
a second controller configured to control charge/discharge of a storage battery as one of the plurality of loads, wherein
the first controller is configured to perform output control following power consumption by the plurality of loads; and
the second controller is configured to
increase charging power to the storage battery when the power control system is operating in a self-sustaining operation,
detect fluctuations in power output of the photovoltaic module or the first controller, while increasing the charging power to the storage battery, and
control charging of the storage battery based on the detected fluctuations,
wherein the second controller performs a process for detecting the fluctuations at regular intervals.

2. The power control system according to claim 1, wherein the second controller computes, based on the fluctuations, power generation that may be supplied by the photovoltaic module or the first controller and controls charge/discharge of the storage battery so that, when a power consumed by one or more loads, other than the storage battery, in the plurality of loads is greater than the power generation, a power of the storage battery is discharged to the loads other than the storage battery.

3. The power control system according to claim 1, wherein the second controller gradually increases charging power to the storage battery when performing the process for detecting the fluctuations, and monitors a change in the charging power, thereby computing a maximum power that may be output by the photovoltaic module or the first controller.

4. The power control system according to claim 1, wherein the second controller controls, on the condition that an amount of charge in the storage battery falls below a reference value, so that the storage battery is charged.

5. The power control system according to claim 4, wherein the second controller controls, on the condition that the amount of charge in the storage battery exceeds the reference value, so that the storage battery is discharged.

6. The power control system according to claim 2, wherein, when the power generation reaches a predetermined range, power supply by the first controller is stopped.

7. The power control system according claim 2, wherein the plurality of loads are connected in parallel to the first controller; and the second controller conditions, when charging the storage battery, power supplied to the storage battery so that a voltage of the storage battery is lower than a voltage of power supplied to the loads other than the storage battery.

8. The power control system according to claim 2, wherein the first controller and the plurality of loads are connected to a commercial power grid so that, when the power generation exceeds a load power consumed by the plurality of loads, a part of the power generation is output to the commercial power grid, or when the power generation falls below the load power, a part of the load power is supplied from the commercial power grid; and the second controller controls charge/discharge so that, when connection with the commercial power grid is disconnected, power is supplied or not supplied to the storage battery.

9. A power control apparatus, for use in a power control system with a first controller configured to control supply of power from a photovoltaic module system to a plurality of loads and perform output control following power consumption by the plurality of loads, the power control apparatus comprising a second controller configured to control charge/discharge of a storage battery as one of the plurality of loads, wherein, during a self-sustaining operation, the second controller:
increases a charging power to the storage battery;
detects fluctuations in power output of the photovoltaic module system or the first controller, while increasing the charging power to the storage battery; and
controls charging of the storage battery based on the detected fluctuations,
wherein the second controller performs a process for detecting the fluctuations at regular intervals.

10. A power control method comprising the steps of:
by a first controller, configured to control supply of power from a photovoltaic module system to a plurality of loads, connected to a photovoltaic module system that performs a load following control; performing output control following power consumption by the plurality of loads; and
by a second controller, configured to control charge/discharge of a storage battery as one of the plurality of loads,
increasing, during a self-sustaining operation, a charging power to the storage battery,
detecting fluctuations in power output of the photovoltaic module system or the first controller, while increasing the charging power to the storage battery, and
based on the detected fluctuations, controlling charging of the storage battery;
wherein a process for detecting the fluctuations is performed by the second controller at regular intervals.

11. The power control apparatus of claim 9, wherein the second controller computes, based on the fluctuations, power generation that may be supplied by the photovoltaic module system and controls charge/discharge of the storage battery so that, when a power consumed by one or more loads, other than the storage battery in the plurality of loads, is greater than the power generation, a power of the storage battery is discharged to the one or more loads other than the storage battery.

12. The power control apparatus of claim 9, wherein the second controller gradually increases charging power to the storage battery when performing the process for detecting the fluctuations, and monitors a change in the charging power, thereby computing a maximum power that may be output by the photovoltaic module system.

13. The power control apparatus according to claim 9, wherein the second controller controls, on a condition that an amount of charge in the storage battery falls below a reference value, so that the storage battery is charged.

14. The power control apparatus according to claim 13, wherein the second controller controls, on a condition that the amount of charge in the storage battery exceeds the reference value, so that the storage battery is discharged.

15. The power control apparatus according to claim 11, wherein, when the power generation reaches a predetermined range, power supply by the first controller is stopped.

16. The power control apparatus according to claim 11, wherein the plurality of loads are connected in parallel to the first controller, and the second controller conditions, when charging the storage battery, power supplied to the storage battery so that a voltage of the storage battery is lower than a voltage of power supplied to the one or more loads other than the storage battery.

* * * * *